US012705454B2

(12) United States Patent
Feltin et al.

(10) Patent No.: US 12,705,454 B2
(45) Date of Patent: Aug. 11, 2026

(54) DISTRIBUTED ARTIFICIAL INTELLIGENCE RUNTIME AT THE NETWORK EDGE AS A SERVICE

(71) Applicant: Cisco Technology, Inc., San Jose, CA (US)

(72) Inventors: Thomas Michel-Ange Feltin, Paris (FR); Benjamin William Ryder, Lausanne (CH); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 913 days.

(21) Appl. No.: 17/888,379

(22) Filed: Aug. 15, 2022

(65) Prior Publication Data

US 2024/0054318 A1 Feb. 15, 2024

(51) Int. Cl.
*G06N 3/04* (2023.01)
*G06N 3/10* (2006.01)

(52) U.S. Cl.
CPC ................. *G06N 3/04* (2013.01); *G06N 3/10* (2013.01)

(58) Field of Classification Search
CPC ........... G06F 9/5066; G06F 2209/5017; G06F 2209/503; G06F 2209/508; G06N 3/04; G06N 3/10
See application file for complete search history.

(56) References Cited

U.S. PATENT DOCUMENTS

2019/0155620 A1 5/2019 Arunachalam et al.
2019/0266015 A1 8/2019 Chandra et al.
2020/0219015 A1 7/2020 Lee et al.
2021/0248002 A1* 8/2021 Li ......................... G06F 9/5027
2021/0390460 A1* 12/2021 Nimmagadda ..... G06F 18/2163
2022/0156368 A1 5/2022 Spyridopoulos et al.
2022/0198296 A1* 6/2022 Liu ......................... H04L 67/52

FOREIGN PATENT DOCUMENTS

WO WO2022115011 A1 6/2022

* cited by examiner

*Primary Examiner* — William Spieler
(74) *Attorney, Agent, or Firm* — Lee & Hayes, P.C.

(57) ABSTRACT

This disclosure describes techniques and mechanisms for enabling a user and third party applications to dynamically partition and place heavy deep learning workloads on standard edge networks to optimize the overall inference throughput of the network while meeting Service Level Objective(s) (SLOs). The techniques may include profiling, partitioning, and splitting of the deep learning workloads, which may be hidden from the user and/or third party application. The user may user interact with a pre-deployed service through a simple SDK that resembles those used for hardware acceleration, such that the current techniques may be easily inserted into their code.

20 Claims, 5 Drawing Sheets

RECEIVE INPUT INCLUDING AN ARTIFICIAL INTELLIGENCE (AI) MODEL
402

DETERMINE LOCATION(S) AT WHICH TO SPLIT THE AI MODEL
404

IDENTIFY COMPUTING DEVICE(S) IN A NETWORK AT WHICH TO RUN WORKLOAD(S) ASSOCIATED WITH PORTION(S) OF THE AI MODEL
406

SPLIT THE AI MODEL AT THE LOCATION(S)
408

DEPLOY A FIRST WORKLOAD ASSOCIATED WITH A FIRST PORTION OF THE AI MODEL TO A FIRST COMPUTING DEVICE OF THE COMPUTING DEVICE(S)
410

DEPLOY A SECOND WORKLOAD ASSOCIATED WITH A SECOND PORTION OF THE AI MODEL TO A SECOND COMPUTING DEVICE OF THE COMPUTING DEVICE(S)
412

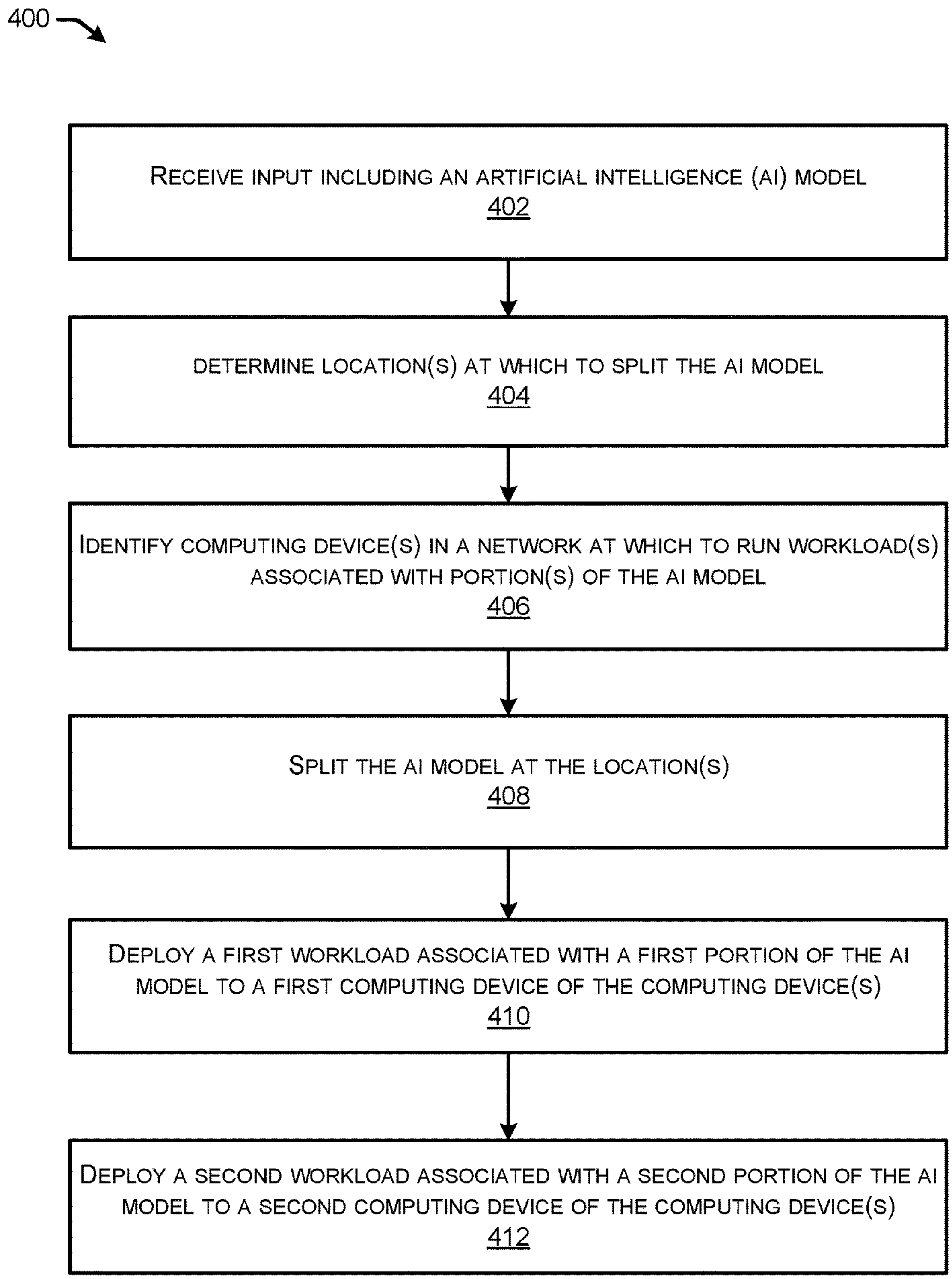

FIG. 4

DISTRIBUTED ARTIFICIAL INTELLIGENCE RUNTIME AT THE NETWORK EDGE AS A SERVICE

TECHNICAL FIELD

The present disclosure relates generally to the field of computer networking, and more particularly to enabling third-party applications to optimally partition and distribute a neural network model to edge device(s) in a network to increase overall throughput of real-time inference on streaming data.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization. Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further from each other.

In recent years, a rapidly growing number of new applications integrate a cloud-offloaded processing. Traditionally, "cloud" refers to remote cloud, a cloud placed in a datacenter and connected to the users through the core infrastructure of the internet. One advantage of remote clouds is their near-infinite compute power capacity. Accordingly, cloud-offloaded applications are different from classical standalone applications by the fact that a part of their processing is done remotely in a cloud. However, the location of remote clouds is usually really far from the users and the data-sources and access paths of the cloud is also out of control for the user. Moreover, cloud offloading may cause high latency, high jitter, high error rate, low available bandwidth, intermittent connectivity, GRPD and legal issues that are incompatible with some emerging applications (e.g., remote medical surgery, offloaded automated driving or real-time detection). Further, when artificial intelligence applications that process real-time streaming data at the edge are presented with strict service level objectives (SLOs) or privacy restrictions, deployment in the cloud can become difficult.

One proposed solution is edge offloading. The idea is to use multiple machines deployed at the edges of a network which can run part of the application components. These edge devices (e.g., sensors, microphones, cameras, user generated data, etc.) can be located close to sensors or users (for example, some cameras have an integrated Tensors Processing Unit (TPU) to run detection neural networks directly after the sensor) or can be located further away (e.g., on the same LAN or the same access network (in cases of mobile networks for example)). Currently, most deep learning applications that run on edge devices are composed of a monolithic pre-trained Deep Neural Network (DNN) which runs inference on data generated at the edge devices. However, most DNNs are often too heavy to run on the edge devices, such that a vast majority of deep learning-based applications are run on remote clouds. In the case of real-time or latency-sensitive applications, or in cases where policy compliance forbids data from leaving the edge devices, offloading inference to the remote cloud is not an option.

Moreover, in resource constrained networks, users (e.g., such as developers) wanting reasonable performance for heavy deep learning workloads often need to choose between buying hardware acceleration equipment, or downsizing their neural networks. However, additional hardware acceleration equipment (GPUs, TPUs, etc.), is expensive. Further, downsizing the neural network also requires extended development efforts, and may hinder performance.

Accordingly, a need exists for systems and methods of enabling users to (i) partition and distribute heavy deep learning workloads on standard edge devices without offloading computation to a remote cloud and avoiding compromises on precision and accuracy and (ii) enable users to use this technology in a systems context.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for enabling third-party applications to optimally partition and distribute a neural network model to edge device(s) in a network to increase overall throughput of real-time inference on streaming data.

DESCRIPTION OF EXAMPLE EMBODIMENTS

Overview

Figure 1:
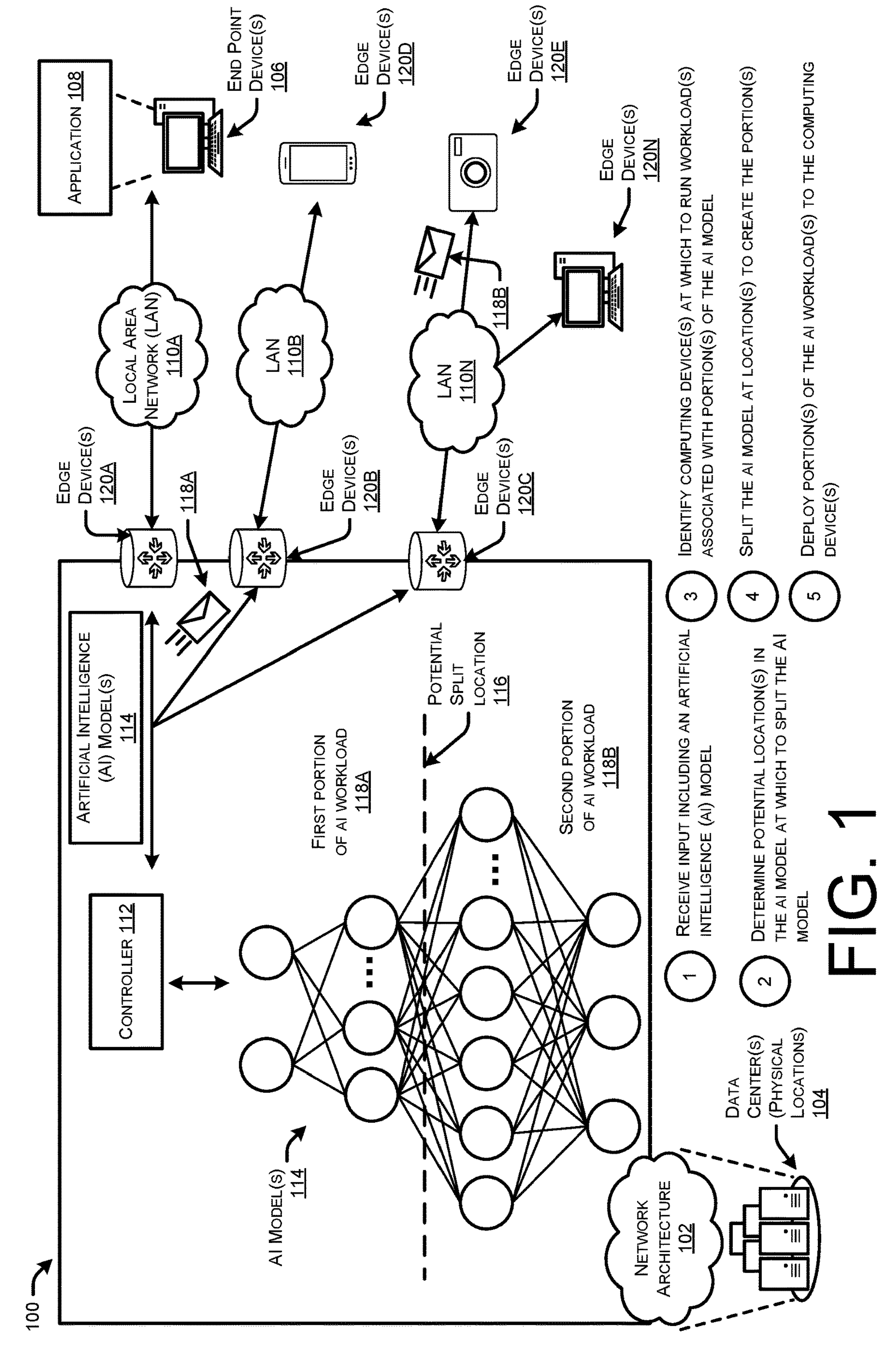
FIG. 1 illustrates a system-architecture diagram of an environment in which an optimized AI runtime system can enable a third-party application to optimally partition and distribute a neural network model to edge device(s) in a network to increase overall throughput of real-time inference on streaming data.

The present disclosure relates generally to the field of computer networking, and more particularly to enabling third-party applications to optimally partition and distribute a neural network model to edge device(s) in a network to increase overall throughput of real-time inference on streaming data.

A method to perform techniques described herein may be implemented by a controller and may include receiving, from an application, input including an artificial intelligence model, determining one or more locations in the artificial intelligence model at which to split the artificial intelligence model, identifying one or more computing devices in the network at which to run workloads associated with one or more portions of the artificial intelligence model, splitting the artificial intelligence model at the one or more locations, deploying a first workload associated with a first portion of the artificial intelligence model to a first computing device of the one or more computing devices, and deploying a second workload associated with a second portion of the artificial intelligence model to a second computing device of the one or more computing devices.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide-area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In recent years, a rapidly growing number of new applications integrate a cloud-offloaded processing. Traditionally, “cloud” refers to remote cloud, a cloud placed in a datacenter and connected to the users through the core infrastructure of the internet. One advantage of remote clouds is their near-infinite compute power capacity. Accordingly, cloud-offloaded applications are different from classical standalone applications by the fact that a part of their processing is done remotely in a cloud. However, the location of remote clouds are usually really far from the users and the data-sources and access paths of the cloud is also out of control for the user. Moreover, cloud offloading may cause high latency, high jitter, high error rate, low available bandwidth, intermittent connectivity, GRPD and legal issues that are incompatible with some emerging applications (e.g., remote medical surgery, offloaded automated driving or real-time detection). Further, when artificial intelligence applications that process real-time streaming data at the edge are presented with strict service level objectives (SLOs) or privacy restrictions, deployment in the cloud can become difficult.

One proposed solution is edge offloading. The idea is to use multiple machines deployed at the edges of a network which can run part of the application components. These edge devices (e.g., sensors, microphones, cameras, user generated data, etc.) can be located close to sensors or users (for example, some cameras have an integrated Tensors Processing Unit (TPU) to run detection neural networks directly after the sensor) or can be located further away (e.g., on the same LAN or the same access network (in cases of mobile networks for example)). Currently, most deep learning applications that run on edge devices are composed of a monolithic pre-trained Deep Neural Network (DNN) which runs inference on data generated at the edge devices. However, most DNNs are often too heavy to run on the edge devices, such that a vast majority of deep learning-based applications are run on remote clouds. In the case of real-time or latency-sensitive applications, or in cases where policy compliance forbids data from leaving the edge devices, offloading inference to the remote cloud is not an option.

Moreover, in resource constrained networks, users (e.g., such as developers) wanting reasonable performance for heavy deep learning workloads often need to choose between buying hardware acceleration equipment, or downsizing their neural networks. However, additional hardware acceleration equipment (GPUs, TPUs, etc.), is expensive. Further, downsizing the neural network also requires extended development efforts, and may hinder performance.

Accordingly, a need exists for systems and methods of enabling users to (i) partition and distribute heavy deep learning workloads on standard edge devices without offloading computation to a remote cloud and avoiding compromises on precision and accuracy and (ii) enable users to use this technology in a systems context.

This disclosure describes techniques and mechanisms for enabling third-party applications to utilize an optimal AI runtime system to optimally partition and distribute a neural network model to edge device(s) in a network to increase overall throughput of real-time inference on streaming data. In some examples, a controller may receive, from an application, input including an artificial intelligence model. The controller may determine one or more locations in the artificial intelligence model at which to split the artificial intelligence model. The controller may identify one or more computing devices in the network at which to run workloads associated with one or more portions of the artificial intelligence model and split the artificial intelligence model at the one or more locations. The controller may deploy a first workload associated with a first portion of the artificial intelligence model to a first computing device of the one or more computing devices and deploy a second workload associated with a second portion of the artificial intelligence model to a second computing device of the one or more computing devices.

In some examples, the optimized AI runtime system may be deployed on one or more edge nodes. The one or more edge nodes may comprise empty shells that may be populated with model(s) by one or more AI applications (e.g., third party applications) in order to accelerate the inference throughput of streaming data. In some examples, the optimized AI runtime system may be deployed prior to a third party application.

In some examples, the optimized AI runtime system may comprise a third party application. In some examples, the application may require the execution of an AI model with a service level objective (SLO). In some examples, the application may interface with a controller and/or may be implemented using a variety of protocols (e.g., REST, gRPC, or any other suitable protocol). In some examples, the application may be deployed on an end point device and/or an edge device associated with a user of the network. In some examples, the application comprises a software development kit (SDK).

In some examples, the optimized AI runtime system may comprise a controller. In some examples, the controller may receive input from a third party application. In some examples, the input may include an artificial intelligence (AI) model. In some examples, the AI model comprises a pre-trained model and/or pre-trained weighted model. In some examples, the AI model is pre-trained using machine learning techniques. In some examples, the controller and/or the optimized AI runtime system stores machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.

As used herein, the terms “machine learning,” “machine-trained,” and their equivalents, may refer to a computing model that can be optimized to accurately recreate certain outputs based on certain inputs. In some examples, the machine learning models include artificial intelligence (At) models, such as deep learning models, including convolutional neural networks (CNN), deep learning neural networks (DNN), and/or artificial intelligence models. The term “neural network,” and its equivalents, may refer to a model with multiple hidden layers, wherein the model receives an input (e.g., a vector) and transforms the input by performing operations via the hidden layers. An individual hidden layer may include multiple “neurons,” each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

As used herein, the terms “workload,” “AI workload,” and their equivalents may refer to a neural network model, a deep learning neural network model and/or an artificial intelligence model. As used herein, the terms “portion of the AI workload,” “portion(s) of the AI workload(s),” and their equivalents, may refer to a portion of the neural network model, AI model, and/or deep learning neural network model. For instance, the portion of the neural network model may correspond to a single layer of the neural network model and/or multiple layers of the neural network model.

In some examples, the controller may partition and distribute the AI model to one or more workers. As used herein “workers” refers to edge device(s) and/or edge node(s) within the network. In some examples, the edge devices may receive one or more portion(s) of the AI model. The edge device(s) may run inference on the portion(s) of the AI model(s). In some examples, the controller may communicate with the edge device(s) using one or more protocols (e.g., REST, RPC, or any other suitable protocol).

In this way, an optimized AI runtime system can optimally split AI model(s) into several pieces, with each piece small enough to fit available compute resources at the edge node(s) without compromising on the performance, while optimizing overall inference throughput. Moreover, users are enabled to split heavy neural network workloads into multiple parts, enabling the user to process the workload on a set of smaller, less capable compute nodes in a distributed manner without compromising on the performance while meeting service level objectives (SLO). Accordingly, by optimizing throughput of the neural network model, a user may run a large and comprehensive A model at the edge without the need to invest into additional, dedicated hardware, thereby decreasing costs associated with the system. Moreover, by enabling the system to appear as a hardware acceleration system to a user, the user can simply interact with a pro-deployed service through a simple SDK that resembles those already used for hardware acceleration, such that users easily insert the optimized AI runtime system into their code, thereby streamlining usability of the system.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an optimized AI runtime system 100 that enables a third-party application to optimally partition and distribute a neural network model to edge device(s) in a network to increase overall throughput of real-time inference on streaming data.

In some examples, the optimized AI runtime system 100 may include a network architecture 102 that includes devices housed or located in one or more data centers 104. The network architecture 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding network architectures 102 may not be located in explicitly defined data centers 104, but may be located in other locations or buildings.

In some instances, the optimized AI runtime system 100 comprises a network device and is included as part of a network architecture 102. The network architecture 102 may generally include, manage, or otherwise be associated with one or more applications or services utilized by users accessing network(s). Network(s) may comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may provide any type of application or service for use by users of client devices (not shown). However, in other instances the optimized AI runtime system 100 may be associated with any type of computing device and be used for any purpose. In some examples, optimized AI runtime system 100 comprises a router, a switch, or any other type of device included in a network architecture.

As illustrated, the optimized AI runtime system 100 includes end point device(s) 106 and edge device(s) 120. In some examples, end point device(s) 106 comprise computing device(s), such as user device(s) (e.g., computers, mobile devices, cameras, etc.) that collect data. For instance, in some examples, the end point device 106 may comprise a smart camera. The edge device(s) 120 may process the data collected by the end point devices 106 and may comprise any computing device, network device (e.g., routers, switches, servers, etc.), sensors, microphones, smart cameras, user generated data, or any other device with processing capabilities. In some examples, the edge device(s) (e.g., edge device(s) 120A-120N) are included on the edge of the internet service provider network. In the illustrative example, edge devices 120A-120N are included as part of the network architecture 102. Additionally or alternatively, the edge device(s) 120 may be part of a user's local network, such as edge device 120N and may receive the data via the LAN 110N. For instance, edge device 120 may be included as part of a user's LAN 110N. While the illustrative example shows a user's local network as being a LAN 110, the local network 110 may comprise any local network, such as a PAN, CAN, MAN, and/or WAN.

As illustrated the end point device(s) 106 may include an application 108. In some examples, the application 108 may comprise a software development kit (SDK). In some examples, the application may correspond to the execution of an AI model with a specific service level objective (SLO). The application 108 may be configured to interface with the controller 112. In some examples, the application may utilize a variety of protocols including REST and/or gRPC.

As illustrated the optimized AI runtime system 100 includes a controller 112. In some examples, the controller 112 is configured to manage synchronization between the edge device(s) 120. In some examples, the controller 112 may enable the application 108 to access one or more services provided by a service provider. In some examples, the controller 112 may be configured to receive commands from applications (e.g., such as application 108) that leverage the service provided by the controller 112.

As illustrated, the controller 112 may receive input from the end point device(s) 106 and/or the application 108. In some examples, the input may comprise one or more artificial intelligence (AI) model(s) 114 (e.g., such as neural network model(s)). As noted above, the AI model(s) 114 may comprise deep learning neural network (DNN) models. As illustrated in FIG. 1, the AI model(s) 114 may comprise multiple layers, such as an input layer, hidden layer(s), and an output layer. For instance, the AI model(s) 114 receive an input (e.g., a vector) at the input layer and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. As illustrated, the AI model(s) 114 may further include at least one fully-connected layer (e.g., the output layer) that receives a feature map output by the hidden layers and transforms the feature map into the output of the AI model(s) 114. In some examples, the AI model(s) 114 comprise a more complex DNN architecture. For instance, the AI model(s) 114 may comprise a SqueezeNet, YOLO, or any other suitable DNN or neural network architecture.

At "1", the controller 112 may receive input including an AI model. In some examples the AI model comprises a neural network model that is configured to process data generated by a computing device. In some examples, the controller 112 may receive the AI model(s) 114 from an end point device 106. In some examples, the controller 112 may receive the AI model(s) 114 from an application 108 on the end point device 106. In some examples, the AI model(s) 114 comprises a pre-trained model and/or a pre-trained weighted model. In some examples, the A model(s) 114 is pre-trained using machine learning technique(s) described above. For instance, the controller 112 may receive the AI model(s) 114 from an end point device 106 and/or application 108, where the input includes a stream of input data, such as from a smart camera. In this example, the AI model 114 is for detecting movement in front of the smart camera. As described above, the edge device 120 may not have a large processing power. For instance, the edge device 120 may be configured to process 1-2 frames per second. Accordingly, if an object in front of the smart camera moves quickly enough, the smart camera may miss the object. In some examples, the controller 112 may identify a network topology and/or device capabilities of device(s) within the network.

At "2", the controller 112 may determine potential location(s) in the AI model at which to split the AI model(s) 114. For instance, the controller 112 may generate an application graph based on the AI model(s) 114. In some examples, the controller 112 may transform the AI model(s) 114 into the application graph. As noted above, the application graph may identify potential split location(s) 116 in the topology of the AI model(s) 114. As described in greater detail below with regard to FIG. 2, the controller 112 may extract information including extracting individual layer consumptions, vector sizes between layers, node capacities, and/or link bandwidths. Accordingly, by extracting the individual layer consumptions, sizes of the vectors between layers, the target node capabilities, and the bandwidth of the network connection between the nodes, the controller 112 may provide an improved method for calculating the optimal way to split and deploy the model.

At "3", the controller 112 may identify computing device(s) at which to run workload(s) associated with portion(s) of the AI model 114. In some examples, the computing device(s) correspond to one or more edge device(s) 120. In some examples, a first portion of the AI workload corresponds to a first portion of the AI model 114.

At "4", the controller 112 may split the AI model at the location(s) to create the portion(s). In some examples, the location corresponds to the potential split location 116. In some examples, splitting the AI model 114 creates and/or generates a first portion of the AI workload 118A and a second portion of the AI workload 118B. For instance, the controller 112 may package portion(s) of the AI workload(s).

At "5", the controller 112 may deploy portion(s) of the AI workload(s) 118 to the computing device(s). For instance, the controller 112 may deploy the packaged containers to the one or more edge device(s) 120. In some examples, each container is deployed and started on the LAN 110 using an execution model (e.g., Kubernetes, Virtual Machines, or any other appropriate execution model). In some examples, and as illustrated in FIG. 1, a first portion of the AI workload 118A may be deployed to a first edge device 120B for processing. For instance, the first edge device 120B may be included a part of the edge of the network architecture 102. In some examples, and as illustrated in FIG. 1, a second portion of the AI workload 118B may be deployed to a second edge device 120N. For instance, the second edge device may be included as part of a user's local network 110.

Figure 2:
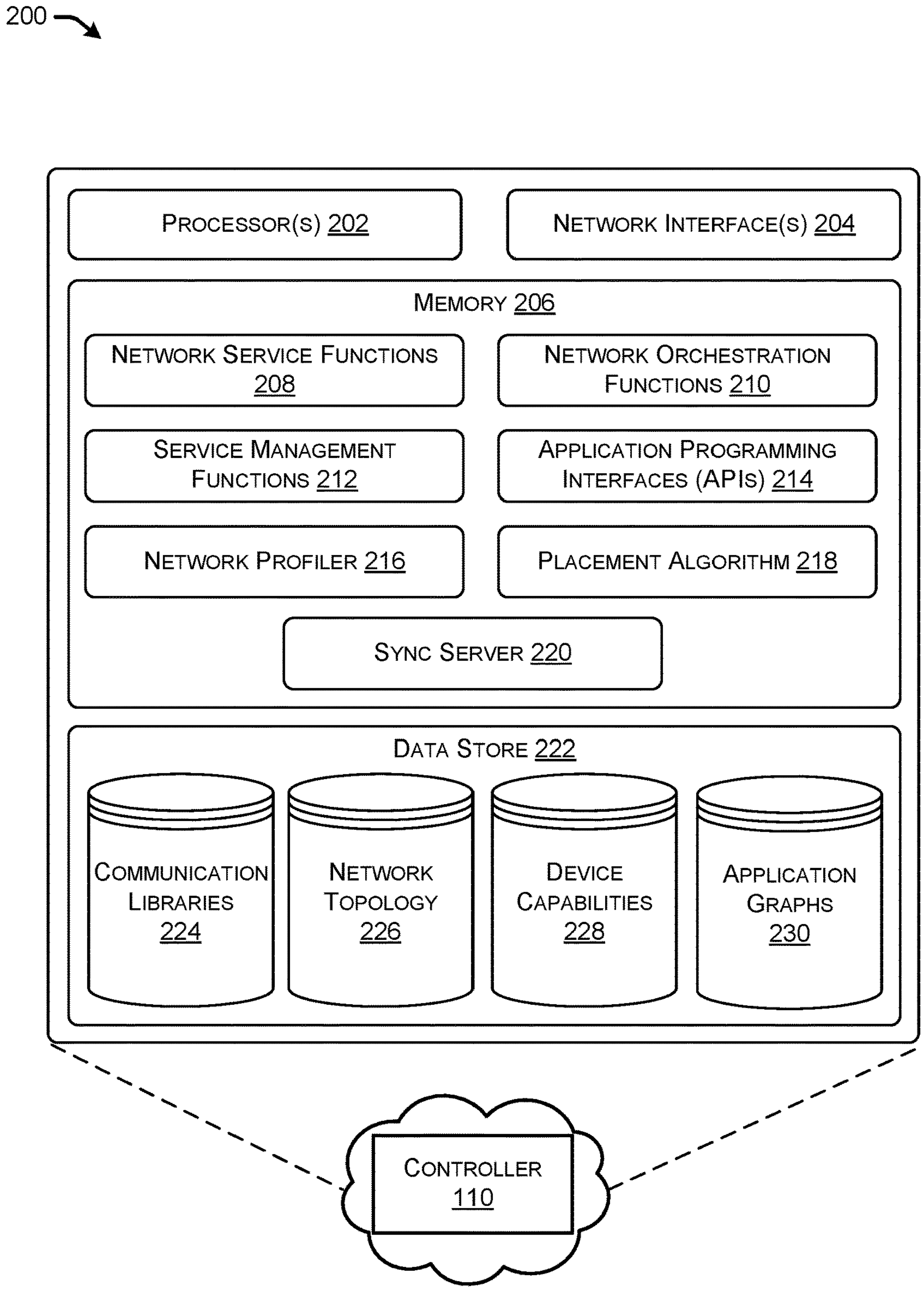
FIG. 2 illustrates a component diagram of an example controller described in FIG. 1.

FIG. 2 illustrates a component diagram of an example controller that receives or receives input including AI model(s) and/or stream(s) of data, partitions an AI workload, and determines location(s) in a network architecture at which to deploy portion(s) of the AI workload. In some instances, the controller may run on one or more computing devices in, or associated with, the network architecture 102 (e.g., a single device or a system of devices). The controller may comprise a single controller that is running, or multiple instances of a network controller running at least partly at a same time.

Generally, the controller 112 may include a programmable controller that manages some or all of the control plane activities of the network architecture 102, and manages or monitors the network state using one or more centralized control models. Generally, the controller 112 may handle at least the functions of (i) receiving, from an application, input including an artificial intelligence model, (ii) determining one or more locations in the artificial intelligence model at which to split the artificial intelligence model, (iii) identifying one or more computing devices in the network at which to run workloads associated with one or more portions of the artificial intelligence model, (iv) splitting the artificial intelligence model at the one or more locations, (v) deploying a first workload associated with a first portion of the artificial intelligence model to a first computing device of the one or more computing devices, and (vi) deploying a second workload associated with a second portion of the artificial intelligence model to a second computing device of the one or more computing devices.

As illustrated, the controller 112 may include, or run on, one or more hardware processors 202 (processors), one or more devices, configured to execute one or more stored instructions. The processor(s) 202 may comprise one or more cores. Further, the controller 112 may include or be associated with (e.g., communicatively coupled to) one or more network interfaces 204 configured to provide communications with the edge device(s) 120, end point device(s) 106, and other devices, and/or other systems or devices in the network architecture 102 and/or remote from the network architecture 102. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The controller 112 may also include memory 206, such as computer-readable media, that stores various executable components (e.g., software-based components, firmware-based components, etc.). The memory 206 may generally store components to implement functionality described herein as being performed by the controller 112. The memory 206 may store one or more network service functions 208, such as a slicing manager, a topology manager to manage a topology of the network architecture 102, a host tracker to track what network components are hosting which programs or software, a switch manager to manage switches of the network architecture 102, a process manager, and/or any other type of function performed by the controller 112.

The controller 112 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network architecture 102 (configurable), and one or more APIs 214 and/or API server(s) for communicating with devices in the network architecture 102 and causing various control plane functions to occur. For instance, the API server may receive commands from outside applications (e.g., such as application 108). The commands may include instructions to (i) populate an AI model, (ii) identify input data stream(s) and/or output data stream(s) for the controller 112 to connect to, (iii) re-compute partitioning and placements, and/or (iv) any other suitable command.

Further, the controller 112 may include a network profiler 216. The network profiler 216 may be configured to receive a pre-trained AI model and/or a pre-trained weighted AI model as an input and output an application graph. In some examples, the application graph may identify split point(s) (e.g., points where the AI model may be split and/or sliced into the smallest possible entity) in the topology of the AI model. In some examples, the network profiler 216 may be configured to extract information from the AI model and/or edge network. For instance, the network profiler 216 may extract information including extracting individual layer consumptions, vector sizes between layers, node capacities, and/or link bandwidths. Accordingly, by extracting the individual layer consumptions, sizes of the vectors between layers, the target node capabilities, and the bandwidth of the network connection between the nodes, the system (e.g., such as the placement algorithm 218) can provide an improved method for calculating the optimal way to split and deploy the model.

The controller 112 may further include a placement algorithm 218. In some examples, the placement algorithm may utilize the information from the network profiler 216 to identify optimized placement of workload portion(s) at edge device(s) 120 to optimize inference throughput (or framerate) of the AI model. In some examples, the optimized placement is identified based at least in part on the network application graph(s) and/or the AI model application graph(s) output by the network profiler 216.

The controller 112 may include a sync server 220. In some examples, the sync server is configured to handle synchronization between the controller 112 and the edge device(s) 120 and/or end point device(s) 106. For instance, the sync server 220 may be configured to package each individual portion of the AI model and deploy each individual portion over the network(s) and/or local network(s) 110.

In some examples, the sync server 220 may include a communication interface and/or may track state(s) associated with one or more of the edge device(s) 120. For instance, the sync server 220 may be configured to monitor the edge device(s) 120 and detect if one or more conditions (e.g., a node goes down, a node loses connection to the network and/or local network 110, there is a change in bandwidth available to a node, there is a change in an amount of CPU available to a node such that performance of the node is degrading) of the network and/or local network 110 changes. For instance, the monitoring component 216 may detect that a node (e.g., an edge device 120) within the LAN 110 has a change in the amount of CPU available to the node, such that performance of the node is degrading (e.g., such as CPU overload). 10054I The controller 112 may further include a data store 222, such as long-term storage, that stores communication libraries 224 for the different communication protocols that the controller 112 is configured to use or perform. Additionally, the data store 222 may include network topology data 226, such as a model representing the layout of the network components in the network architecture 102. The data store 222 may store device capabilities 228 that includes telemetry data indicating computing resource usage and/or availability on the different network components in the network architecture 102. The device capabilities may further include data indicating available bandwidth, available CPU, delay between nodes, computing capacity, processor architecture, processor type(s), etc. Additionally, the data store 222 may include application graphs 230.

Figure 3:
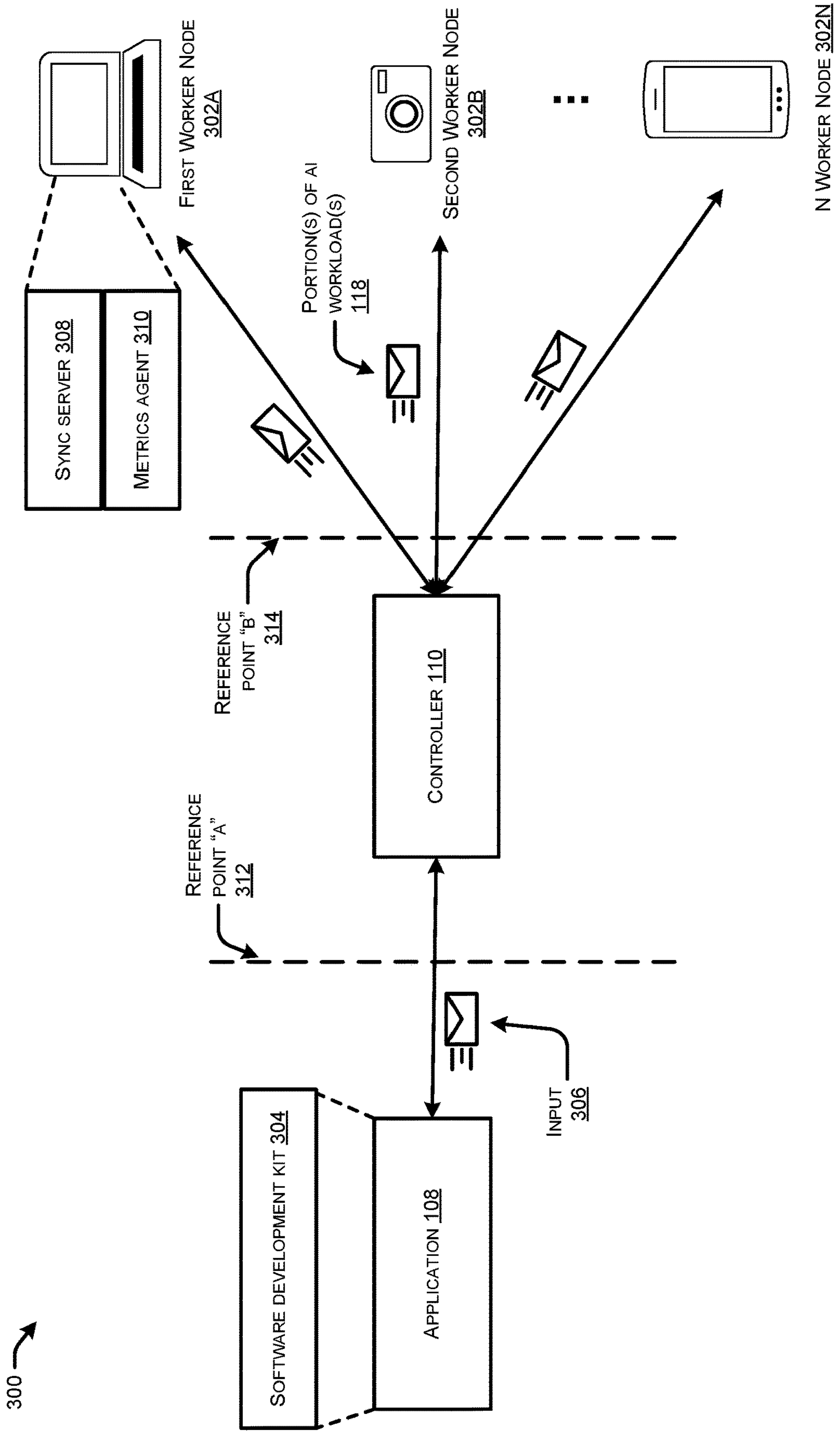
FIG. 3 illustrates a flow diagram of example communication between components of the optimized AI runtime system 100 of FIGS. 1 and 2.

FIG. 3 illustrates a flow diagram 300 of example communication between components of the optimized AI runtime system 100 of FIGS. 1 and 2. In some examples, the optimized AI runtime system 100 may be deployed on one or more edge device(s) 120 and/or an end point device 106. As noted above, in some examples, the optimized AI runtime system 100 may be deployed on one or more edge device(s) 120 and/or end point device(s) 106 as an empty shell. In some examples, the optimized AI runtime system 100 may be deployed before the application 108. For instance, the optimized AI runtime system 100 may be deployed prior to the application 108, as a service, with a controller 112 and one worker (e.g., worker node(s) 302) per node at the edge of the network 110.

As noted above, the controller 112 may be configured to manage synchronization between the worker node(s) 302 and/or receive commands or instructions from application(s) 108 accessing the optimized AI runtime system 100 as a service. As noted above, the controller may comprise an (i) API server and/or API service, (ii) network profiler, (iii) placement algorithm, and (iv) sync server.

As illustrated, the application 108 may comprise a software development kit 304. In some examples, the application 108 corresponds to a third party application that utilizes one or more AI model(s) with specific service level objective(s)(SLOs). As illustrated in FIG. 3, the application 108 may communicate with the controller 112 via reference point "A" 312. In some examples, the communication may be implemented using one or more communication protocols, including REST, gRPC, or any other suitable protocol. In some examples, the application 108 may be configured to communicate with the API server of the controller. In some examples, the API server of the controller 112 may be configured to receive calls to (i) load AI model(s) to the optimized AI runtime system, (ii) provide input/output streams, (iii) start/stop inference work on the optimized AI runtime system, (iii) trigger optimal placement computations in the placement agent of the controller, and/or (iv) edit configurations (e.g., which node(s) to consider, restrictions on placement, etc.).

In some examples, a user may be able to interact with the application 108 in order to load AI model(s) and/or input or output streams of data, in order to optimize overall inference throughput. In some examples, the action(s) taken by the controller 112 is hidden from the user(s), such that the user(s) simply interact with a pre-deployed service using the SDK 304. The SDK 304 may resemble systems used for hardware acceleration, such that user(s) may easily utilize the system to insert the optimized AI runtime system into their code. Accordingly, the optimized AI runtime system 100 may act as a virtual hardware acceleration service, but may utilize a distributed inference system as described herein.

In some examples, the sync server of the controller 112 is configured to enable various interactions with the application 108, illustrated by reference point A 312. The interactions may include synchronization with the optimized AI runtime system 100. For instance, the controller 112 may receive command(s), including "STATE", which may check whether a service is set up on the edge node and/or is ready to compute optimized inference. The controller 112 may return, to the application 108 information about the service (e.g., information on the worker node(s) and the state(s) of the worker node(s)).

The interaction(s) may further include push configuration interactions. The command(s) may comprise one or more of the following: (i) "MODEL", which may instruct the controller to load an AI model into the optimized AI runtime system 100 (e.g., as a reference and/or a file); (ii) "/O", while may instruct the controller to load reference(s) to input data and/or output data sources for the AI model to run on; and/or (iii) "PLACEMENT", which may instruct the controller to load a specific partitioning and placement configuration to run a pre-loaded AI model.

The interaction(s) may further include trigger computations. For instance, the command(s) may comprise "COM- PUTE_PLACEMENT", which may correspond to a user triggered instruction for the controller to perform computation of optimal partitioning and placement of AI model(s).

As illustrated, the controller 112 may receive input from the application 108. The input may comprise one or more AI model(s) 114 and/or one or more input and/or output streams of data. In some examples, the AI model 114 may comprise a pro-trained model (e.g., machine learning model and/or artificial intelligence model). In some examples, the AI model 114 may comprise a weighted pre-trained model. As noted above, the controller 112 may be configured to transform the network topology 226 of the AI model 114 into an application graph. For instance, the controller 112 may partition the AI model 114 into the application graph by identifying potential split location(s) in the AI model 114. In some examples, the potential split location(s) comprise a smallest possible piece of the AI model 114. As described above, the controller 112 may extract information including extracting individual layer consumptions, vector sizes between layers, node capacities, and/or link bandwidths. As noted above, by extracting the individual layer consumptions, sizes of the vectors between layers, the target node capabilities, and the bandwidth of the network connection between the nodes, the controller 112 may provide an improved method for calculating the optimal way to split and deploy the model.

As described above, the controller 112 may split the AI model(s) and send portion(s) of the AI workload(s) 118 to the worker node(s) 302. In some examples, the worker node(s) 302 may correspond to one or more edge node(s) and/or edge device(s) 120.

As illustrated in FIG. 3, the worker node(s) 302 may comprise a sync server 308 and a metrics agent 310. The sync server 308 may be configured to handle synchronization with the controller 112 and may provide a communication interface through which the worker node(s) 302 may receive instruction(s) from the controller 112. The metrics agent 310 may be configured to store telemetry information associated with node capacity, link bandwidth, and/or inference speed for the worker node 302. In some examples, the worker node 302 may provide the telemetry information to the controller 112 for use in computing and/or determining optimal split location(s). In some examples, the worker node(s) 302 may further comprise a partition, which is the runtime containing the portion of the AI workload and may run inference on the portion of the AI workload.

In some examples, the worker node(s) 302 may utilize and/or leverage available drivers and/or other tools stored on the edge node(s) 120. For instance, the worker node(s) 302 may utilize and/or leverage tools and/or drivers such as CUDA, TensorRT, or any other available driver and/or tool.

As illustrated in FIG. 3, the worker node 302 sync server 308 may communicate with the controller 112 in order to receive instructions and/or commands, as illustrated by reference point B 314. The instructions and/or commands may describe available interactions between the controller 112 and the worker node(s) 302, and may be hidden from the application 108.

The interactions may include commands for setting up the optimized AI runtime system 100. For instance, the commands may comprise (i) "CLAIM" (e.g., allows the controller 112 to claim the worker node 302 as part of the controller's cluster) and/or (ii) "PUSH_WORKER_ADDRESSES" (e.g., the controller 112 may push information about the cluster to a given worker node 302).

The interactions may further include commands for loading an AI model and/or data. For instance, the commands may comprise (i) "PUSH_MODEL" (e.g., controller pushes AI model(s) as a reference or a file for worker node(s) to load), (ii) "PUSH_IO" (e.g., controller pushes input/output data sources for the worker node(s) to connect to), (iii) "PUSH_PLACEMENT" (e.g., controller pushes partitioning and placement information associated with the AI model(s) for the worker node(s) to compute).

The interactions may further include commands for retrieving runtime information from the worker nodes 302. For instance, the commands may comprise (i) "PULL_STATE" (e.g., controller retrieves state from the worker node, such as current input and/or output, AI model or placement being computed, as well as telemetry information), (ii) "MODEL_STATE" (e.g., controller retrieves a state (e.g., indicating whether the AI model is loaded and profiled on the worker node) of the AI model from the worker node), (iii) "BANDWIDTH_STATE" (e.g., controller retrieves state of link profiling from the worker node).

The interactions may further include trigger computations. For instance, the commands may comprise "BANDWIDTH TEST" (e.g., the controller may trigger link profiling of the worker node(s)).

FIG. 4 is a flow diagram of an example method 400 for enabling third-party applications to optimally partition and distribute a neural network model to edge device(s) in a network to increase overall throughput of real-time inference on streaming data. In some instances, the steps of method 400 may be performed by a device (e.g., controller 112, edge device(s) 120, or any other device) that includes one or more processors and one or more non-transitory computer-readable media storing computer-executable instructions that, when executed by the one or more processors, cause the one or more processors to perform operations of method 400.

At 402, the system may receive input including an artificial intelligence model. For instance, the system may receive the input from an application (such as application 108 described above). In some examples, the application comprises a software development kit (SDK). In some examples, the input may comprise one or more input and/or output streams of data. In some examples, the input may comprise a plurality of AI model(s). As noted above, the AI model 114 may comprise a deep learning neural network model, such as a weighted, pre-trained model. In some examples, the input is received from a user computing device associated with a user of the network. For instance, the input may be received from an end point device 106.

At 404, the system may determine location(s) in the AI model(s) at which to split the AI model(s). In some examples, the system may identify no potential split location(s). In some examples, the system may identify a plurality of potential split locations. As noted above, the system may determine the location by identifying a potential split location between one or more layers of the AI model. In some examples, the split location is associated with optimizing throughput of the network At 406, the system may identify computing device(s) in the network at which to run workload(s) associated with portion(s) of the AI model(s). In some examples, the computing device(s) may correspond to one or more edge device(s) and/or worker node(s) in the network. In some examples, the computing device(s) are identified based at least in part on one or more service level objectives associated with the computing device(s).

In some examples, the computing device(s) may be identified based at least in part on using information associated with the network topology and/or device capabilities. For instance, the computing device(s) may be identified based on determining that an amount of central processing unit (CPU) available on a computing device is sufficient to support at least one of the workload portion(s) and/or determining that an amount of bandwidth available to the computing device is sufficient to receive data over the network to support the workload portion(s). In some examples, the computing device may be identified based at least in part on determining that a processor type or device type associated with the computing device is optimized for running the workload portion(s).

At 408, the system may split the AI model at the location(s). In some examples, the system may split the AI model at a plurality of locations.

At 410, the system may deploy a first workload associated with a first portion of the AI model to a first computing device of the computing device(s). In some examples, the first workload corresponds to a first portion of the AI workload 118 described above. For instance, the controller 112 may package and deploy the first workload as described above.

At 412, the system may deploy a second workload associated with a second portion of the AI model to a second computing device of the computing device(s). In some examples, the second workload corresponds to a second portion of the AI workload 118 described above. For instance, the controller 112 may package and deploy the first workload as described above.

Figure 5:
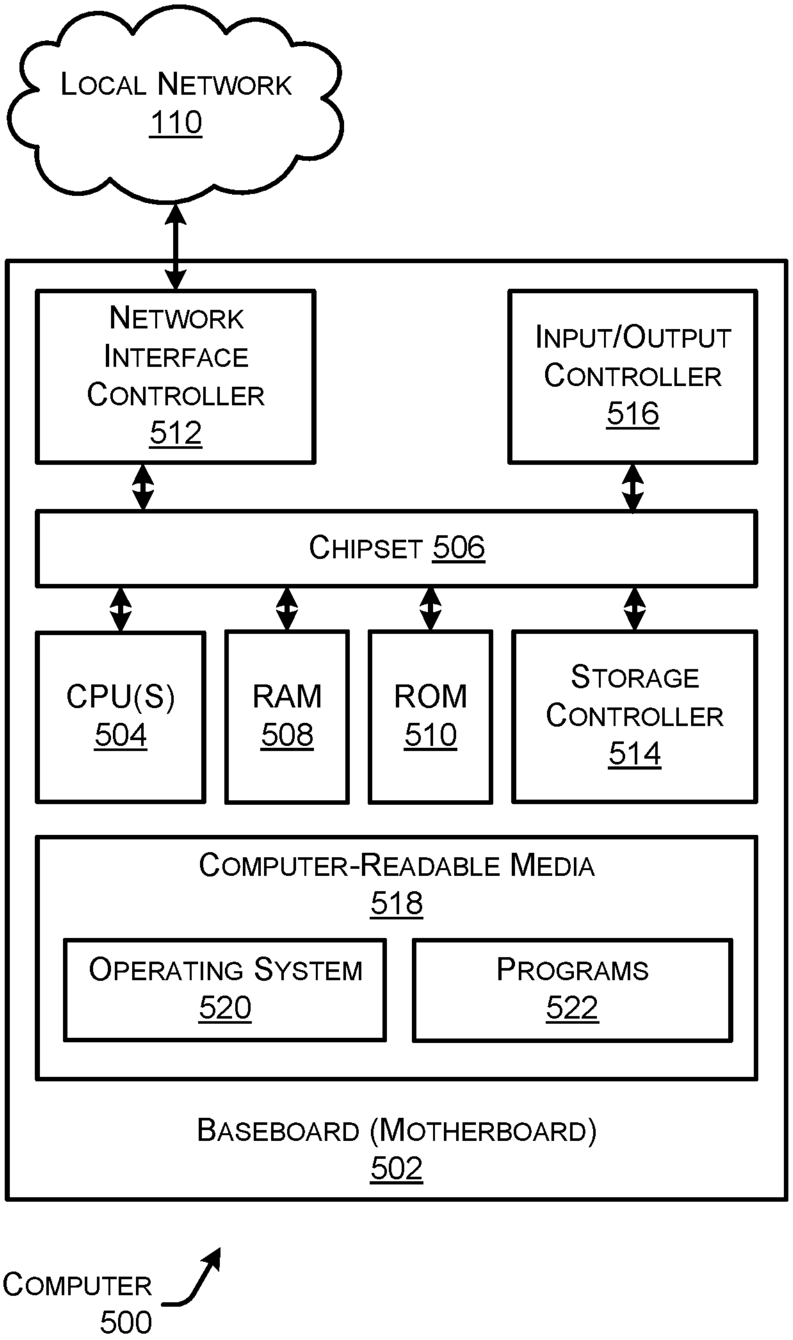
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to an optimized AI runtime system 100, a controller 112, an edge device 120, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as local network 110. The chipset 506 can include functionality for providing network connectivity through a NIC 512, such as a gigabit Ethernet adapter. The NIC 512 is capable of connecting the computer 500 to other computing devices over the local network 108. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the optimized AI runtime system 100, the controller 112, the edge device 120, and/or any components included therein, may be supported by one or more devices similar to computer 500. Stated otherwise, some or all of the operations performed by the optimized AI runtime system 100, the controller 112, the edge device 120, and or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM") digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 51S can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of an optimized AI runtime system 100, a controller 112, a edge device 120, and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the optimized AI runtime system 100, the controller 112, the edge device 120, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for enabling third party applications to utilize optimal partitioning and distribution of neural network model(s) to edge device(s) and improve throughput of inference on neural network model(s). For instance, the programs 522 may cause the computer 500 to perform techniques for efficiently partitioning and distributing an AI model to edge device(s) in a network, including: receiving, from an application, input including an artificial intelligence model; determining one or more locations in the artificial intelligence model at which to split the artificial intelligence model; identifying one or more computing devices in the network at which to run workloads associated with one or more portions of the artificial intelligence model; splitting the artificial intelligence model at the one or more locations; deploying a first workload associated with a first portion of the artificial intelligence model to a first computing device of the one or more computing devices; and deploying a second workload associated with a second portion of the artificial intelligence model to a second computing device of the one or more computing devices.

In this way, an optimized AI runtime system can optimally split AI model(s) into several pieces, with each piece small enough to fit available compute resources at the edge node(s) without compromising on the performance, while optimizing overall inference throughput. Moreover, users are enabled to split heavy neural network workloads into multiple parts, enabling the user to process the workload on a set of smaller, less capable compute nodes in a distributed manner without compromising on the performance while meeting service level objectives (SLO). Accordingly, by optimizing throughput of the neural network model, a user may run a large and comprehensive AI model at the edge without the need to invest into additional, dedicated hardware, thereby decreasing costs associated with the system. Moreover, by enabling the system to appear as a hardware acceleration system to a user, the user can simply interact with a pro-deployed service through a simple SDK that resembles those already used for hardware acceleration, such that users easily insert the optimized AI runtime system into their code, thereby streamlining usability of the system. Additionally, the programs 522 may comprise instructions that case the computer 500 to perform the specific techniques for enabling third-party applications to optimally partition and distribute a neural network model to edge device(s) in a network to increase overall throughput of real-time inference on streaming data.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by a controller of a network, the method comprising:

receiving, from an application, a request from a user device to host an artificial intelligence model that is configured to provide a service for users;

determining one or more locations in the artificial intelligence model at which to split the artificial intelligence model;

identifying one or more computing devices in the network at which to run workloads associated with one or more portions of the artificial intelligence model, the one or more computing devices including a first computing device and a second computing device;

identifying a bandwidth metric associated with a network connection between the first computing device and the second computing device;

determining, using the bandwidth metric associated with the network connection between the first computing device and the second computing device, one or more optimal locations at which to split the artificial intelligence model;

splitting the artificial intelligence model at the one or more optimal locations;

deploying a first workload associated with a first portion of the artificial intelligence model to the first computing device;

deploying a second workload associated with a second portion of the artificial intelligence model to the second computing device;

receiving, at the controller and from a user device, a command for the artificial intelligence model to perform a function of the service on behalf of the user device;

causing, by the controller, the artificial intelligence model to perform the function by communicating with the first workload on the first computing device and the second workload on the second computing device, wherein the communicating by the controller is hidden from the user device; and providing, from the controller and to the user device, a result of the function performed on behalf of the user device.

2. The method of claim 1, further comprising:

exposing, by the controller, an interface via a software development kit (SDK), wherein:

the request is received from the user device via the SDK; and providing the result is performed by sending, via the SDK, the result of the function performed on behalf of the user device.

3. The method of claim 1, wherein the request is received from a user computing device associated with a user of the network.

4. The method of claim 1, wherein determining the one or more optimal locations includes identifying a split location between one or more layers of the artificial intelligence model, the split location being associated with optimizing throughput of the network.

5. The method of claim 1, wherein identifying the one or more computing devices is based at least in part on one or more service level objectives associated with the one or more computing devices.

6. The method of claim 1, wherein the request further comprises one or more input or output streams of data.

7. The method of claim 1, further comprising presenting, by the controller and to the application, the artificial intelligence model deployment as a virtual hardware acceleration service, wherein the application comprises a software development kit (SDK) configured to enable a third-party developer to interact with the controller using an interface that resembles an interface used for hardware acceleration, and wherein the splitting of the artificial intelligence model and the deploying of the first workload and the second workload by the controller are hidden from the third-party developer.

8. The method of claim 1, further comprising:

monitoring, by the controller, one or more network conditions associated with the network, the one or more network conditions including at least one of a CPU load of the first computing device or the second computing device, a bandwidth change associated with the network connection between the first computing device and the second computing device, or a failure of the first computing device or the second computing device;

determining, based on the monitored one or more network conditions, that a recomputation of one or more optimal locations at which to split the artificial intelligence model is warranted; and in response to determining that the recomputation is warranted:

recomputing, using an updated bandwidth metric associated with the network connection between the first computing device and the second computing device, one or more updated optimal locations at which to split the artificial intelligence model;

splitting the artificial intelligence model at the one or more updated optimal locations; and redeploying a first updated workload associated with a first updated portion of the artificial intelligence model to the first computing device and a second updated workload associated with a second updated portion of the artificial intelligence model to the second computing device.

9. A system comprising:

one or more processors; and one or more non-transitory computer-readable media storing computer-executable instructions that, when executed by the one or more processors, cause the one or more processors to perform operations comprising:

receiving, by a controller of a network and from an application, a request from a user device to host an artificial intelligence model that is configured to provide a service for users;

determining, by the controller, one or more locations in the artificial intelligence model at which to split the artificial intelligence model;

identifying, by the controller, one or more computing devices in the network at which to run workloads associated with one or more portions of the artificial intelligence model, the one or more computing devices including a first computing device and a second computing device;

identifying a bandwidth metric associated with a network connection between the first computing device and the second computing device;

determining, using the bandwidth metric associated with the network connection between the first computing device and the second computing device, one or more optimal locations at which to split the artificial intelligence model;

splitting, by the controller, the artificial intelligence model at the one or more optimal locations;

deploying, by the controller, a first workload associated with a first portion of the artificial intelligence model to the first computing device;

deploying, by the controller, a second workload associated with a second portion of the artificial intelligence model to the second computing device;

receiving, at the controller and from a user device, a command for the artificial intelligence model to perform a function of the service on behalf of the user device;

causing, by the controller, the artificial intelligence model to perform the function by communicating with the first workload on the first computing device and the second workload on the second computing device, wherein the communicating by the controller is hidden from the user device; and providing, from the controller and to the user device, a result of the function performed on behalf of the user device.

10. The system of claim 9, the operations further comprising:

exposing, by the controller, an interface via a software development kit (SDK), wherein:

the request is received from the user device via the SDK; and providing the result is performed by sending, via the SDK, the result of the function performed on behalf of the user device.

11. The system of claim 9, wherein the request is received from a user computing device associated with a user of the network.

12. The system of claim 9, wherein determining the one or more optimal locations includes identifying a split location between one or more layers of the artificial intelligence model, the split location being associated with optimizing throughput of the network.

13. The system of claim 9, wherein identifying the one or more computing devices is based at least in part on one or more service level objectives associated with the one or more computing devices.

14. The system of claim 9, wherein the request further comprises one or more input or output streams of data.

15. One or more non-transitory computer-readable media storing computer-readable instructions that, when executed by one or more processors, cause the one or more processors to perform operations comprising:

receiving, from an application, input including an artificial intelligence model;

determining one or more locations in the artificial intelligence model at which to split the artificial intelligence model;

identifying one or more computing devices in a network at which to run workloads associated with one or more portions of the artificial intelligence model, the one or more computing devices including a first computing device and a second computing device;

identifying a bandwidth metric associated with a network connection between the first computing device and the second computing device;

determining, using the bandwidth metric associated with the network connection between the first computing device and the second computing device, one or more optimal locations at which to split the artificial intelligence model;

splitting the artificial intelligence model at the one or more optimal locations;

deploying a first workload associated with a first portion of the artificial intelligence model to the first computing device; and deploying a second workload associated with a second portion of the artificial intelligence model to the second computing device, wherein determining the one or more optimal locations is based at least in part on, vector sizes between layers of the artificial intelligence model, or node capacities of the one or more computing devices to optimize inference throughput.

16. The one or more non-transitory computer-readable media of claim 15, wherein the application comprises a software development kit (SDK).

17. The one or more non-transitory computer-readable media of claim 15, wherein the artificial intelligence model comprises a deep learning neural network.

18. The one or more non-transitory computer-readable media of claim 15, wherein determining the one or more optimal locations includes identifying a split location between one or more layers of the artificial intelligence model, the split location being associated with optimizing throughput of the network.

19. The one or more non-transitory computer-readable media of claim 15, wherein identifying the one or more computing devices is based at least in part on one or more service level objectives associated with the one or more computing devices.

20. The one or more non-transitory computer-readable media of claim 15, wherein the input further comprises one or more input or output streams of data.

* * * * *